United States Patent [19]

Blaimschein et al.

[11] Patent Number: 4,525,112
[45] Date of Patent: Jun. 25, 1985

[54] MILLING MACHINE

[75] Inventors: Gottfried Blaimschein; Otto Marzy, both of Steyr, Austria

[73] Assignee: GFM Gesellschaft für Fertigungstechnik und Maschinenbau Gesellschaft m.b.H., Steyr, Austria

[21] Appl. No.: 598,418

[22] Filed: Apr. 9, 1984

[30] Foreign Application Priority Data

May 19, 1983 [EP] European Pat. Off. ........ 83890087.6

[51] Int. Cl.³ .................................................. B23C 3/06
[52] U.S. Cl. ........................................ 409/199; 29/6; 51/73 R; 51/105 SP
[58] Field of Search ............... 409/199, 200, 143; 51/73 R, 105 SP; 29/6

[56] References Cited

U.S. PATENT DOCUMENTS

| 3,880,025 | 4/1975 | Kralowetz et al. | 409/200 X |
| 4,326,323 | 4/1982 | Kralowetz et al. | 409/200 X |
| 4,337,011 | 6/1982 | Schmid | 409/199 |
| 4,423,990 | 1/1984 | Kodama et al. | 409/199 X |

FOREIGN PATENT DOCUMENTS

| 2658970 | 11/1978 | Fed. Rep. of Germany | 409/199 |
| 2940732 | 5/1980 | Fed. Rep. of Germany | 409/200 |

Primary Examiner—Frank T. Yost
Attorney, Agent, or Firm—Kurt Kelman

[57] ABSTRACT

A milling machine comprises a machine bed, two workpiece-gripping heads carried by the machine bed, and at least one cutter carriage, which is carried by the machine bed and is movable along guide rails which are normal to the longitudinal axis of the machine. The cutter carriage carries an internally cutting, annular milling cutter. To permit the milling cutter to be changed quickly and easily, the cutter carriage is movable along the guide rails from a central position over a distance which exceeds the radial positioning and feed movement of the milling cutter to an offset position for a tool change. In that position, at least a major portion of the milling cutter, when viewed in the direction of the longitudinal axis of the machine, is disposed outside the contours of the gripping heads.

3 Claims, 1 Drawing Figure

U.S. Patent     Jun. 25, 1985     4,525,112
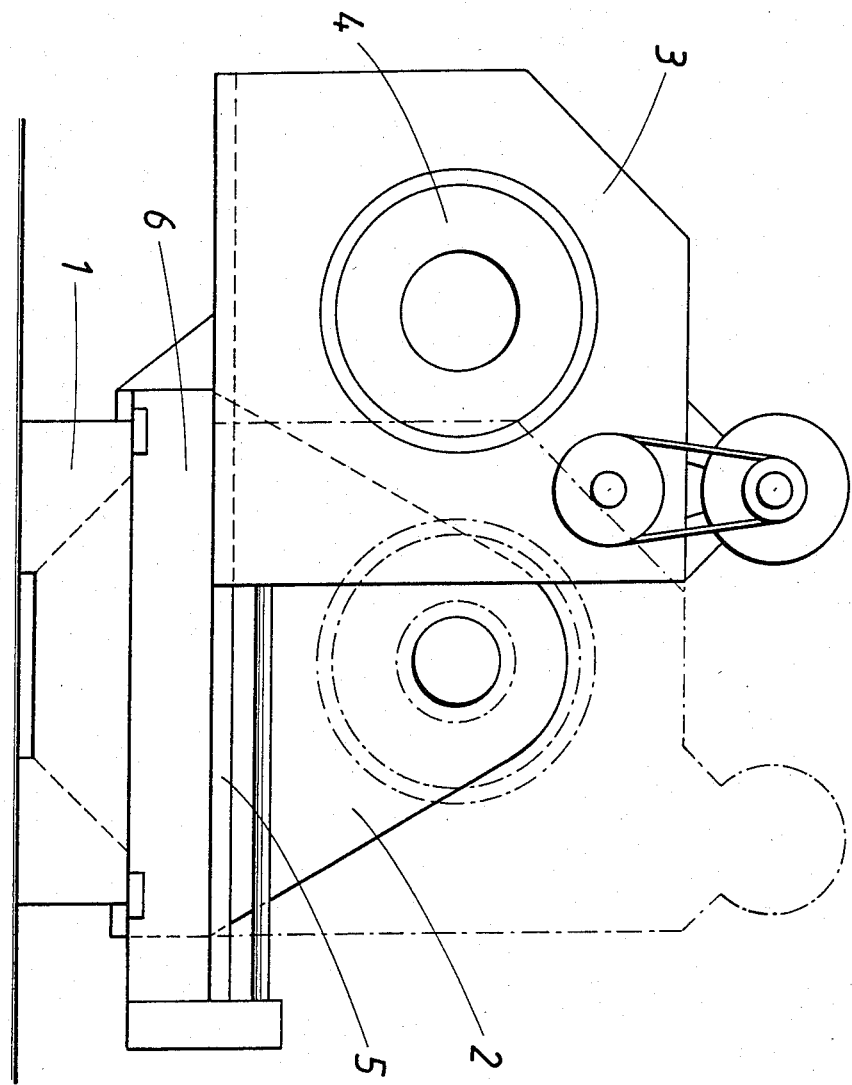

MILLING MACHINE

This invention relates to a milling machine comprising a machine bed, two workpiece gripping heads and at least one cutter carriage, which is supported on guide rails extending normal to the axis of the machine and carries an internally cutting, annular milling cutter.

Owing to the provision of milling cutters having lamellar teeth consisting of replaceable carbide cutting plates or reversible ceramic cutting plates, the trend in the design of milling machines is toward higher cutting speeds in order to reduce the milling times whereas the proportion of non-productive times in the total time required to machine a workpiece progressively increases. In the use of milling machines having internally cutting milling cutters, the change of the milling cutter is time-consuming and involves a high labor expenditure. That operation must be carried out under particularly unfavorable conditions in the use of milling machines having two carriages and an additional backrest, such as are used for the series production of crankshafts. In the previous practice the milling cutter to be changed is centered on the axis of the machine so that only a small space is available for the removal and installation of the milling cutter and special tool changers are required because the access is difficult. For this reason a change of tools is difficult and costly and takes a long time so that it adds substantially to the undesirable non-productive times.

It is an object of the invention to improve these conditions and to provide a milling machine which is of the kind described first hereinbefore and permits the milling cutters to be changed easily and within relatively short time.

This object is accomplished in accordance with the invention in that the cutter carriage is movable along the guide rails from a central position, in which the milling cutter is centered on the axis of the machine, over a distance which exceeds the radial positioning and feed movement of the milling cutter to an offset tool-changing position, in which at least a major part of the milling cutter when viewed in the axial direction of the machine is disposed outside the contours of the gripping heads. Because the cutter carriage can be moved out from the center of the machine beyond the extent which is required for the maximum feed movement for machining a workpiece, i.e., in most cases over at least 60% of the inside diameter of the milling cutter, the milling cutter can be moved to a tool-changing position in which the milling cutter is entirely freely accessible and does not restrict the space required for the use of any desired toolchangers. Because adequate space is available and the milling cutter is conveniently accessible, a tool change can be economically effected within a short time and can be automated without difficulty. This tool change involving only very short non-productive times requires only a few alterations in the conventional design of milling machines because the required larger transverse movement of the cutter carriage involves only a small additional structural expenditure and control expenditure. In dependence on the concept of a given machine, that transverse movement of the cutter carriage can be effected in any direction which is normal to the axis of the machine.

In milling machines having two cutter carriages the tool change can be further simplified if, in accordance with the invention, the milling cutter carried on each cutter carriage is mounted so that it is removable toward the side which is remote from the other cutter carriage, i.e., toward the adjacent workpiece-gripping head. Each tool changer associated with a given cutter carriage can be moved into engagement with said carriage from the adjacent gripping head when a tool change is to be effected so that the milling cutters carried by both cutter carriages can be changed at the same time.

An illustrative embodiment of a milling machine embodying the invention is shown on the drawing in an diagrammatic front elevation, in which the forward gripping head has been omitted.

A machine bed 1 carries two workpiece-gripping heads 2 and also carries a cutter carriage 3, in which an internally cutting, annular milling cutter 4 is mounted. The cutter carriage 3 is slidable mounted on a track formed by guide rails 5, which are mounted on a longitudinally movable carriage 6 and extend normal to the longitudinal axis of the machine. That longitudinal axis is defined by the centers of the chucks provided in the workpiece-gripping heads.

To permit a change of the milling cutters 4 to be effected within a short time and to permit a convenient access to the milling cutters 4 for such change, the cutter carriage 3 is movable from a central position, in which the milling cutter is centered on the longitudinal axis of the machine (as is indicated in phantom) along the guide rails 5 beyond a feed-limiting position to an offset position for a tool change (as indicated by solid lines). In that offset position the milling cutter 4 is disposed outside the contours of one or both of the gripping heads and is entirely freely accessible. In the offset position for a tool change, the cutter carriage 3 may protrude beyond the end of the guide rails 5 so that a narrower design of the machine can be adopted.

When the cutter carriage is in that offset position, the tool change can be effected in much shorter time and in a much simpler manner and because the space is not confined it is possible to use desirable and particularly automatic tool changers. The possibility to move the milling cutter to an offset position for a tool change affords special advantages in milling machines which comprise two cutter carriages and/or additional backrests so that the space available for changing the milling cutter in a central position is highly confined. In milling machines comprising two cutter carriages, each milling cutter is preferably removable from the associated cutter carriage toward the adjacent gripping head, so that the side which is remote from the other cutter carriage, i.e., toward the access to each cutter carriage will not be obstructed by the other cutter carriage. Because it is merely essential that the milling cutters 4 to be changed are rendered freely accessible, the direction in which the cutter carriage is offset for a tool change is not significant so that the cutter carriage can be moved to the offset position for a tool change in any milling machine and that position can be selected in dependence on the design of each machine.

What is claimed is:
1. In a milling machine comprising
   a machine bed,
   two workpiece-gripping heads spaced apart along said machine bed and defining a longitudinal axis,
   track-forming means carried by said machine bed and providing at least one track which is normal to said longitudinal axis, at least one cutter carriage, which is mounted on and slidable along said at least one track to a central position and a feed-limiting position, and at least one internally cutting, annular milling cutter which is carried by said at least one cutter carriage and arranged to be centered on said longitudinal axis when said at least one cutter carriage is in said central position and adapted to perform a feed movement during a movement of said at least one cutter carriage from said central position to said feed-limiting position, said at least one track has such a length that said at least one cutter carriage is slidable along said at least one track beyond said feed-limiting position to an offset tool-changing position and said at least one milling cutter is so arranged that at least a major portion of said at least one milling cutter is disposed outside the contour at least one of said gripping heads in a view taken along said longitudinal axis when said at least one cutter carrier is in said offset tool-changing position.

2. The improvement set forth in claim 1 as applied to a milling machine in which said track-forming means provide two of said tracks, one of said cutter carriages is mounted on and slidable along each of said tracks to a central position and a feed-limiting position and one of said milling cutters is carried by each of said cutter carriages, each of said milling cutters is mounted in the associated cutter carriage to be removable therefrom toward the side which is remote from the other of said cutter carriages.

3. The improvement set forth in claim 1, wherein said milling cutter is mounted in said cutter carriage to be removable therefrom in the direction toward one of said workpiece-gripping heads and said milling cutter is so arranged that at least a major portion of said milling cutter is disposed outside the contour of said one gripping head in a view taken along said longitudinal axis when said cutter carriage is in said offset tool-changing position.

* * * * *